March 8, 1932.   W. L. RICHARDSON   1,848,548
SWING HANGER
Filed Jan. 28, 1930
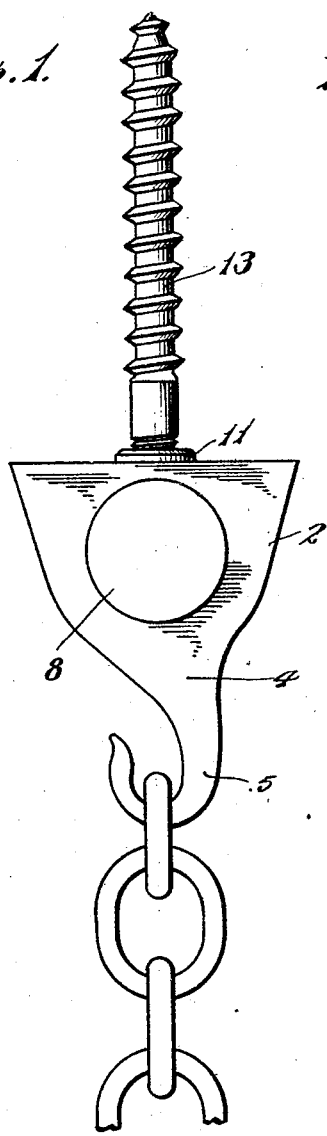
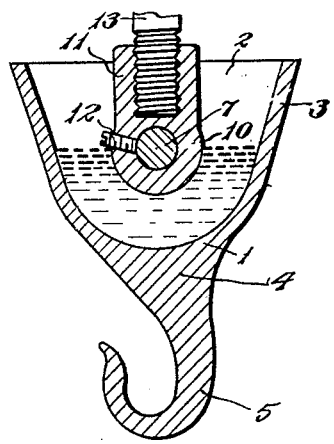
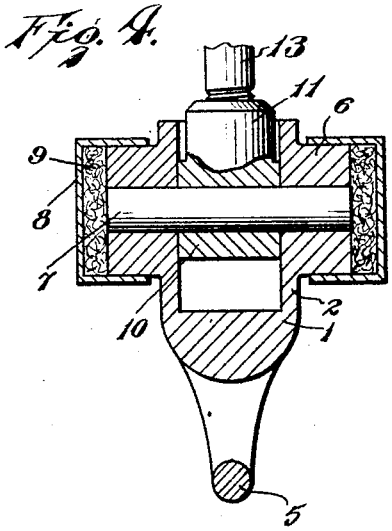
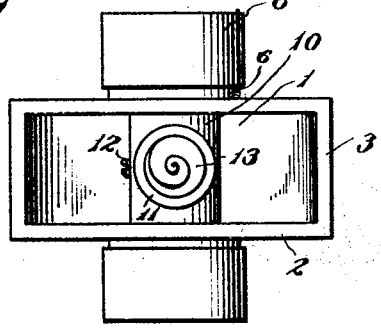
Inventor
W. L. Richardson
By Lacey & Lacey
Attorneys Patented Mar. 8, 1932

1,848,548

UNITED STATES PATENT OFFICE

WILBERT LEE RICHARDSON, OF LOUISVILLE, KENTUCKY

SWING HANGER

Application filed January 28, 1930. Serial No. 424,108.

This invention relates to an improved swing hanger and seeks, among other objects, to provide a device which will obviate the noise usually incident to the rocking of a swing or the like.

Another object of the invention is to provide a swing hanger which will operate for long periods of time without repeated oiling.

A further object of the invention is to provide a device of this character which may be installed easily and which will not interfere with the proper functioning of the swing.

Still further objects of the invention not specifically mentioned in the foregoing will be apparent during the course of the following description.

In the drawings:

Figure 1 is a side elevation of the device.

Figure 2 is a top plan view.

Figure 3 is a vertical sectional view of the device.

Figure 4 is a vertical sectional view at right angles to Figure 3.

The swing hanger comprising the subject matter of the present invention comprises a preferably cast metal lubricant receiving cup 1 having side walls 2 and diverging end walls 3, said side and end walls defining a substantially rectangular mouth for the cup. The cup is reduced near its lower end to form a solid stem 4, which is extended and curved to form a hook 5.

Formed on the side walls 2 medially thereof are alined bearings 6 and journaled in the bearings to extend transversely of the cup is a shaft 7. Frictionally fitting tightly over the bearings are removable caps 8 and carried in the caps are packings 9, preferably formed of a fibrous material. It is to be observed that the caps 8 and packings 9 form sealed joints with the bearings to prevent escape of a lubricant from about the shaft.

Removably fixed on the shaft 7 within the cup is a sleeve 10 and formed on the sleeve is a stem 11, the sleeve snugly fitting between the side walls of the cup. As may be seen more clearly in Figure 3 of the drawings. The sleeve is fixed to the shaft by a set screw 12 so that the sleeve thus limits the shaft against endwise movement through the bearings.

Screwed into the stem 11 is an anchor screw 13 which is adapted to screw into a rafter or the like.

In use, the device is first secured in the desired position by screwing the anchor screw 13 into a rafter or the like. A lubricant is then poured into the cup 1 to a level slightly above the shaft 7. The cup is preferably not filled to the top as spilling of the lubricant would occur when the cup is rocked. The swing supporting chain or rope is then attached to the hook 5. As the swing is rocked, the cup is caused to rock on the shaft so that the lubricant will be distributed along the shaft into the bearings for preventing squeaking of the parts and the noise usually incident to the rocking of a swing. The packings 9 will, of course, become saturated with oil for lubricating the shaft at its ends and attention is further directed to the fact that, as the end walls diverge, greater swinging latitude is given to the cup 4.

What is claimed is:

A device of the class described including a lubricant receiving cup having side walls provided with oppositely disposed aligned bearings, a shaft journaled by the bearings, a sleeve mounted on the shaft and provided with a stem having a set screw carried by the sleeve and locking said sleeve and stem to said shaft, an anchor screw removably connected with the stem, said anchoring screw providing means whereby the device may be secured to a ceiling, caps fitting about the outer ends of the bearings, and packings carried within the cap and disposed to abut the opposite corresponding ends of the shaft to prevent escape of lubricant from the cup.

In testimony whereof I affix my signature.

WILBERT LEE RICHARDSON. [L. S.]